Sept. 1, 1959  H. S. VAN BUREN, JR  2,901,938
SELF THREADING FASTENING BEARING A HELIX THE LEADING
END OF WHICH IS ROUNDED TO INITIATE THREAD ROLLING
Filed Jan. 31, 1957
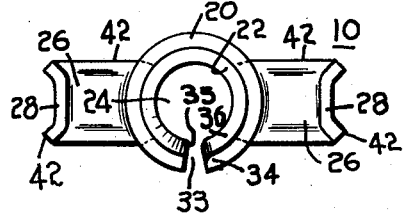
Fig. 1.
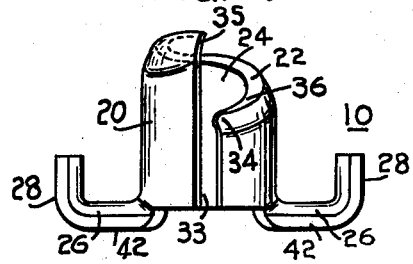
Fig. 2.
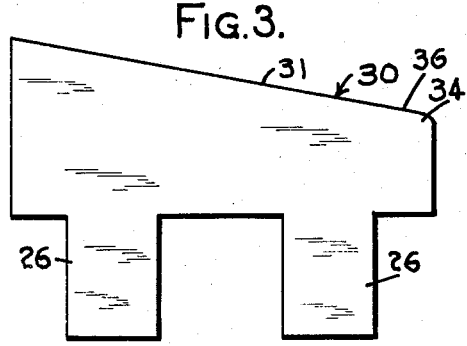
Fig. 3.
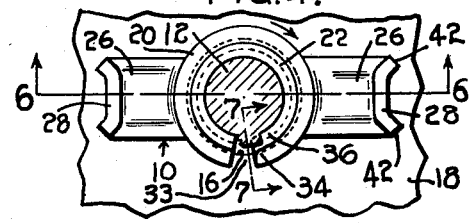
Fig. 4.
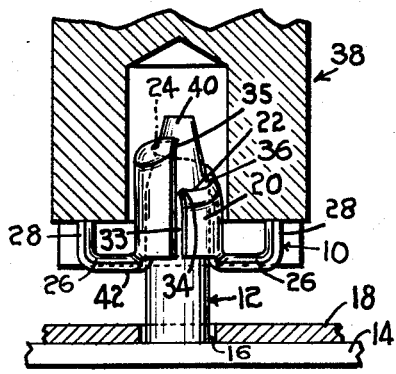
Fig. 5.
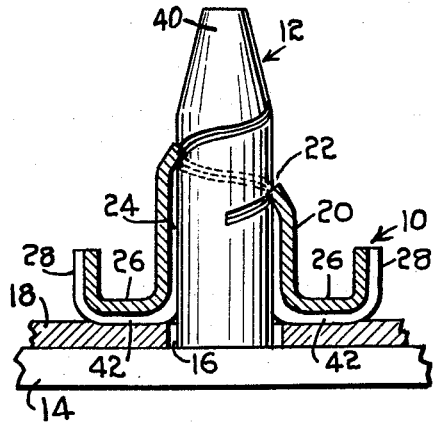
Fig. 6.
Fig. 7.
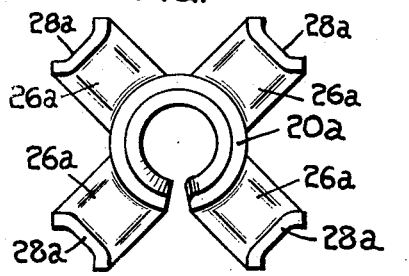
Fig. 8.
INVENTOR:
HAROLD S. VAN BUREN JR.,
By Walter P. Jones
ATTORNEY.

United States Patent Office 2,901,938
Patented Sept. 1, 1959

2,901,938

SELF THREADING FASTENING BEARING A HELIX THE LEADING END OF WHICH IS ROUNDED TO INITIATE THREAD ROLLING

Harold S. Van Buren, Jr., Cambridge, Mass., assignor to United-Carr Fastener Corporation, Boston, Mass., a corporation of Delaware Application January 31, 1957, Serial No. 637,558

2 Claims. (Cl. 85—32)

This invention relates generally to fastening devices and has particular reference to a sheet metal nut for assembly onto an unthreaded stud.

Many types of sheet metal fasteners are known which are designed for assembly onto smooth studs protruding from a device through a panel opening to retain the device on a panel. Such devices usually have a group of inclined tongues disposed about a stud-receiving opening for digging into engagement with the surface of the stud. Although fasteners of this type are satisfactory for some applications, they are not of themselves capable of drawing the stud through the panel opening to tighten the device against the panel, but instead the device must be forced tightly against the panel by other means when the fastener is assembled. This can be inconvenient when the one face of the panel is not readily accessible to a workman installing a fastener on the reverse side thereof.

Threaded fasteners are, of course, an obvious solution. However, it is inconvenient, expensive, or impossible to put threads on the stud, particularly when the article to be attached is formed of die cast metal. In the past it has been proposed to provide a nut which cuts its own threads on the stud. However, in many cases the article to be attached is chromium plated, which provides an extremely hard surface on the stud, and a nut capable of cutting threads on studs of this type has been found too expensive for most applications.

An object of this invention is to provide a nut which is capable of threading into tight engagement onto a smooth chromium-plated stud.

A further object of this invention is to provide a nut of the type described which is adapted for economical manufacture of sheet metal.

A further object of this invention is to provide a nut of the type described which is capable of being pushed and rotated onto a stud to bite into the surface thereof to draw it tightly against the panel.

Another object of this invention is to provide a nut having a relatively small diameter for use in areas where space is restricted.

Another object of this invention is to provide a nut to protect brittle die cast studs by encasing them within heat-treated sheet carbon steel.

In the drawing:

Fig. 1 is a plan view of a fastener embodying the features of the invention;

Fig. 2 is a front elevation of the fastener as shown in Fig. 1;

Fig. 3 is a view of a blank from which the fastener is formed;

Fig. 4 is a plan view of the fastener assembled onto a stud which is partly in section along the line of the helix;

Fig. 5 is a view in elevation, partly in section, of the fastener held by a tool in position for assembly onto a stud;

Fig. 6 is a view, partly in section, taken on line 6—6 of Fig. 4;

Fig. 7 is a view, partly in section, taken on line 7—7 of Fig. 4; and

Fig. 8 is a plan view of a modified form of the fastener.

Referring to the drawings, Fig. 1 through 7, there is illustrated a fastening device 10, which is adapted for assembly onto a smooth stud 12, protruding from an article 14 through an opening 16 in a panel 18 to retain the article in assembly on the panel.

The article 14 may be a nameplate, an ornament, or the like, formed of die cast metal which has been plated with chromium.

The fastening device 10 is formed of high carbon sheet steel and comprises an upright cylindrical body portion 20, formed in a portion of a helix 22, with a stud-receiving aperture 24 substantially central and extending the length of the body.

The dimensions of the device are so arranged that the internal diameter of the body portion 20 is slightly less than the diameter of the stud 12 to be assembled therein. Extending substantially perpendicular to the body portion are two legs 26 with their outermost portions 28 bent upward so as to lie parallel to the body.

In the manufacture of the device, Fig. 3 shows a trapezoidal shaped blank 30, composed of sheet metal having the upper edge cut on a diagonal 31, one edge of the diagonal cut on a taper with projecting legs 26 extending downward from the lower portion thereof. With this type of blank, my fastener 10 is preferably formed by rolling the blank 30 on a mandrel (not shown) until the desired helicoid form is obtained, with a vertical slit 33 extending the length of the device. The slope of the diagonal 31 determines the angle of the helix; and the radius 34, formed on the leading edge of the helix, initiates the thread-rolling operation, with the remainder of the helix remaining in contact with the stud terminating abruptly in a trailing edge 35. After the formation of the helical cylinder, the downward projecting legs 26 are bent upward away from the aperture 24 and substantially at right angles to the axis of the cylinder with the free end portions of the legs 28 bent upward so as to lie substantially co-planar to the cylinder body 20.

The stud 12 onto which the fastener is to be assembled may be provided with a truncated conical end 40 to facilitate starting the fastener into engagement therewith. As the fastener is pushed and turned onto the stud, the lower section of the cylinder 20 acts as a guide aligning the stud 12 with the cutting edge of the helix 36; the fastener 10 flexes slightly, to enlarge the aperture causing the inner circumference of the helix to bear tightly against the stud 12. As the fastener is rotated in a clockwise direction, the rounded leading corner 34 of the helix tends to start a groove in the stud. Rotation of the fastener thereafter tends to wind the edge of the helix down the stud, indenting or grooving the surface of the stud in such a manner that a thread is formed with the helix remaining in contact throughout its entire length. A suitable tool 38 as illustrated in Fig. 5 is used for engagement with the projecting legs 26 and as the fastener engages the panel, the edges 42 of the legs 26 tend to dig into the surface of the panel with the resultant increase in torque so that the free end portion 28 of the legs 26 tilt and release the tool to prevent over-torquing of the fastener.

When the fastener is in position on the stud, its shape tends to protect the stud by encasing it within the carbon steel shell.

Fig. 8 shows a modified form of fastener having an upright cylindrical body portion 20a with two additional legs 26a—26a with free end portions 28a—28a for additional bearing against the surface of the panel.

Since certain other obvious modifications may be made in the device without departing from the scope of the invention, it is intended that all matter contained herein be interpreted in an illustrative and not in a limiting sense.

I claim:

1. In the combination of a threadless stud and a self-threading fastening device for rotation onto the stud for pressing threads thereon by a rolling action thereagainst, the improvement of a self-threading fastening device comprising a heat treated, resilient, tubular body having a stud receiving aperture extending axially therethrough, said tubular body having one end thereof formed in a portion of a continuous helix having a lower leading edge and an upper trailing edge, said helix having a diameter less than that of the stud received in said aperture, the lower leading edge of said helix having a rounded lead corner which initiates the thread pressing action on the stud surface, the edge portion of said helix from the lower leading edge to the upper trailing edge being inclined upwardly from the body and toward the stud receiving aperture, said edge portion of said helix being in thread pressing engagement with the stud substantially at all times whereby upon rotation of the fastening device onto the stud, the leading edge of the helix initiates an initial thread pressing action on the stud surface, and the edge portion of the helix continues the thread pressing on the stud surface during the rotation of the fastening device.

2. In the combination of a threadless stud and a self-threading fastening device for rotation onto the stud for pressing threads thereon by a rolling action thereagainst, the improvement of a self-threading fastening device comprising a heat treated, resilient, sheet metal blank rolled into a tubular body having a central, axially extending aperture therein for accommodating the threadless stud, said tubular body being divided longitudinally by a slot thereby forming spaced, longitudinally extending side edges, one of said side edges having a longitudinal length greater than the other resulting in a long side edge and a short side edge, said short side edge joined to said long side edge by a helix to produce a leading edge at the free upper corner edge of the short side edge and a trailing edge at the top free upper corner edge of the long side edge, said helix having a diameter less than that of the stud received in the aperture with the side edges thereof from the leading edge to the trailing edge being inclined upwardly from the body and toward the stud receiving central aperture, the leading edge of the helix having a rounded lead corner for initiating the thread pressing action on the stud, said helix being in thread pressing engagement with the stud substantially at all times whereby upon rotation of the fastening device onto the stud, the leading edge of he helix initiates an initial thread pressing action onto the stud surface and the edge portion of the helix continues the thread pressing on the stud surface during rotation of the fastening device.

References Cited in the file of this patent
UNITED STATES PATENTS

| | | |
|---|---|---|
| 1,966,520 | Rayner | July 17, 1934 |
| 1,978,364 | Hotchkin | Oct. 23, 1934 |
| 2,244,976 | Tinnerman | June 10, 1941 |
| 2,364,880 | Tinnerman | Dec. 12, 1944 |
| 2,561,036 | Sodders | July 17, 1951 |

OTHER REFERENCES

Automotive Industries, October 15, 1956, page 141.